United States Patent

Davis

(10) Patent No.: US 11,269,151 B2
(45) Date of Patent: Mar. 8, 2022

(54) PROTECTIVE CABLE OR DUCT ROUTING ENCLOSURE

(71) Applicant: FTTX Technology Advisors, LLC, Dawsonville, GA (US)

(72) Inventor: Mark F. Davis, Dawsonville, GA (US)

(73) Assignee: FTTX Technology Advisors, LLC, Hamilton, GA (US)

( * ) Notice: Subject to any disclaimer, the term of this patent is extended or adjusted under 35 U.S.C. 154(b) by 0 days.

(21) Appl. No.: 16/760,928

(22) PCT Filed: Sep. 10, 2018

(86) PCT No.: PCT/US2018/050138
§ 371 (c)(1),
(2) Date: May 1, 2020

(87) PCT Pub. No.: WO2019/089129
PCT Pub. Date: May 19, 2019

(65) Prior Publication Data
US 2021/0173166 A1 Jun. 10, 2021

Related U.S. Application Data

(60) Provisional application No. 62/581,467, filed on Nov. 3, 2017.

(51) Int. Cl.
*G02B 6/00* (2006.01)
*G02B 6/44* (2006.01)

(52) U.S. Cl.
CPC ......... *G02B 6/4459* (2013.01); *G02B 6/4441* (2013.01); *G02B 6/4471* (2013.01)

(58) Field of Classification Search
CPC ... G02B 6/4459; G02B 6/4471; G02B 6/4441
See application file for complete search history.

(56) References Cited

U.S. PATENT DOCUMENTS

| 6,263,141 B1 | 7/2001 | Smith |
| 2005/0092512 A1 | 5/2005 | Kogure |

(Continued)

FOREIGN PATENT DOCUMENTS

| EP | 1892809 A1 * | 2/2008 | .......... H02G 3/0608 |
| WO | 2003073575 A1 | 9/2003 | |

OTHER PUBLICATIONS

AR DOC#3499 (Department of Air Force) dated Nov. 5, 2010. Retrieved online from <URL:https//hwbdocuments.env.nm.gov/Kirtland%20AFB/KAFT3484.pdf>.

(Continued)

*Primary Examiner* — Ellen E Kim
(74) *Attorney, Agent, or Firm* — Akerman, LLP (57) ABSTRACT

An enclosure includes a base and at least three members joined to the base, each member having inner and outer walls and extending upward from the base to form at least a first opening and a second opening along an outer surface formed by the outer walls of the members and an interior space bounded by the inner walls, where the first opening and the second opening are wide enough to accommodate one or more cables routed from the first opening to the second opening along the inner wall of the member positioned between the first opening and the second opening, and where the inner wall positioned between the first opening and the second opening has a radius of curvature that prevents a cable routed from the first opening to the second opening along the inner wall from bending beyond a minimum bend radius.

13 Claims, 4 Drawing Sheets

(56) References Cited

U.S. PATENT DOCUMENTS

| | | | |
|---|---|---|---|
| 2006/0250263 A1* | 11/2006 | Chun | G02B 6/4471 |
| | | | 340/652 |
| 2008/0199139 A1* | 8/2008 | Henderson | H01R 13/72 |
| | | | 385/135 |
| 2009/0060442 A1 | 3/2009 | Dofher | |
| 2011/0129193 A1 | 6/2011 | Thigpen | |
| 2013/0256028 A1 | 10/2013 | Oiwa | |
| 2014/0023334 A1* | 1/2014 | Larsson | G02B 6/4446 |
| | | | 385/135 |

OTHER PUBLICATIONS

International Search Report for corresponding PCT application No. PCT/US2018/050138, dated Dec. 12, 2018.

\* cited by examiner

PROTECTIVE CABLE OR DUCT ROUTING ENCLOSURE

CROSS-REFERENCE TO RELATED APPLICATIONS

This application is a U.S. National Stage Application of and claims priority to PCT/US18/50138 titled "Protective Cable or Duct Routing Enclosure," filed on Sep. 10, 2018. PCT/US18/50138 claims priority to U.S. Prov. App. 62/581,467 filed on Nov. 3, 2017. The entire contents of the PCT/US18/50138 and 62/581,467 applications are incorporated herein by reference for all purposes.

SUMMARY

The present application discloses and describes (i) protective fiber optic cable or duct routing enclosures and (ii) methods of deploying protective fiber optic cable or duct routing enclosures. In operation, the protective fiber optic cable or duct routing enclosures disclosed and described herein protect the bend radius and crush resistance of fiber optic cables and/or duct systems (i) while the fiber optic cables and/or duct systems are being installed and (ii) after the fiber optic cables and/or duct systems have been installed. In some embodiments, the disclosed protective fiber optic cable or duct routing enclosures are used with road-based micro-trenching and keyhole applications.

Micro-trenching involves cutting a small 0.25-inch to 1.5-inch wide and 2-inch to 12-inch deep slot into and along an asphalt or concrete street bed, sidewalk, or other thoroughfare or roadway. Most common installations are 0.5 inches wide by 4 inches deep and can be located anywhere in the street surface. Although the protective cable routing enclosures are particularly advantageous for micro-trenching applications, persons of skill in the art would understand that the protective cable routing enclosures disclosed and described herein could be used in connection with other cable deployment procedures now known or later developed.

After creating the micro-trench along the roadway, micro-ducts (or other types of ducting or conduit) are deployed within the trench to accommodate fiber optic cables (or perhaps other types of cables). In operation, the fiber optic cables are deployed within (i) the micro-ducts within the micro-trench or (ii) directly within the micro-trench without a micro-duct. Other types of ducting or other protective conduit could be deployed within the micro-trench as well to carry other types of cables, piping, or other utility facilities.

It is desirable to connect buildings located near the roadway to the fiber optic cable(s) deployed within the micro-ducts installed in the micro-trench. Connecting a home or other building to the fiber optic cable(s) deployed within the micro-ducts installed in the micro-trench typically includes creating an access trench from the home or building (or perhaps an access pedestal connected to the home or other building) to the micro-trench in the roadway. In typical deployments, the access trench is dug perpendicular or substantially perpendicular to the micro-trench, although the access trench may not be perpendicular or substantially perpendicular to the micro-trench in all deployments. Once the access trench is completed, fiber optic cable is deployed from the micro-trench to the home/building (or associated access pedestal) via the access trench.

Fiber optic cables (and some duct systems) typically have a minimum bend radius so as not to damage the glass fibers within the fiber optic cable. This bend radius specification is typically about 10 times the diameter of the cable or duct system. To accommodate the bend radius limitations of the micro-ducting and/or cable(s) and avoid damage to the micro-ducting and fiber optic cable(s) deployed therein, traditional micro-trench deployments include cutting out a portion of the asphalt, concrete, or other road surface so that the ducting and cabling can be routed from the micro-trench to the access trench without bending the ducting and (most importantly) the fiber optic cable beyond its minimum bend radius.

Traditionally, these "cut outs" in the road surface are made by sawing multiple 45-degree cuts and chiseling out the road surface to allow space in the "cut out" portion of the roadway to accommodate the proper bend radius of the ducting and/or cabling. Because the bend radius of a typical fiber optic cable is about 10 times the diameter of the fiber optic cable, a fiber optic cable with larger diameter has a correspondingly larger bend radius, which in turn requires cutting and chiseling out a larger portion of the road surface to accommodate the larger bend radius.

After cutting, chiseling out, and removing a portion of the road surface, installing the duct, and deploying the fiber optic cable(s) in the duct, the "cut out" portions of the road surface must be replaced and patched in a way that both (i) protects the duct and fiber optic cable(s) deployed therein and (ii) supports the weight of cars, trucks, and other vehicles that travel along the road. The process of replacing and patching the "cut out" is sometimes referred to as reinstatement. Existing "cut out" and reinstatement methods suffer from multiple limitations.

First, current methods of cutting out the road surface require multiple cuts and chiseling, which adds time and cost to a fiber optic cable deployment project. Second, current "cut out" methods often result in inconsistent and sharp edges, which can damage or kink ducts during duct installation, which can further cause damage to fiber optic cable deployed within the ducts. Sometimes the damage from inconsistent and sharp edges occurs during the reinstatement process and is not discovered until after reinstatement is completed, which results in further time and cost to redo that portion of the fiber optic cable deployment project. Third, existing reinstatement methods typically require a contractor to bring additional materials for reinstatement to the project site for use in the reinstatement procedure because much of the material that is broken or chiseled away during the "cut out" procedure is not usable for the reinstatement procedure. Fourth, traditional methods of using asphalt material to reinstate the (often large) cavities left after removing the cut and chiseled out portions of the roadway frequently cause the asphalt-reinstated portions of the roadway to crack and fail over time, which can damage the underlying road bed, duct, and/or the fiber optic cable(s) deployed within the ducts. And finally, the reinstatement process often leaves an unsightly road surface repair. Other drawbacks to current "cut and chisel out" and reinstatement procedures will be apparent to those of skill in the art.

To overcome or at least ameliorate the above-described limitations and to provide other advantages that will be apparent to those of skill in the art, the present application discloses and describes various embodiments of (i) a protective cable routing enclosure or casing that allows for perpendicular routing of fiber optic cables and ducts while maintaining proper bend radius specifications for the ducting and cabling, and (ii) methods of installing the disclosed protective cable routing enclosure/casing in connection with a fiber optic cable deployment project. As mentioned above, although the disclosed systems and methods are particularly advantageous for fiber optic cable deployment projects, the disclosed systems and methods could be used for deploying other types of ducts, conduits, cabling, piping, or other utility facilities now known or later developed.

Some embodiments of the protective cable routing enclosure are circular or at least substantially circular in shape. In such embodiments, the circular design of the protective cable routing enclosure speeds the installation process by allowing use of a "keyhole" pavement cutting or sawing method to excavate a circular-shaped portion of the asphalt or other road surface material, thereby allowing the circular-shaped protective cable routing enclosure to be quickly and easily installed into the circular-shaped keyhole cut-out created by the keyhole pavement cutting machine. Some embodiments are 12-inches in diameter, but smaller or larger enclosures could be used depending on bend radius requirements of the duct(s) and fiber optic cable(s) that the protective cable routing enclosure is intended to accommodate, as well as the quantity of ducts and/or fiber optic cables that the enclosure is intended to accommodate.

Installing the disclosed protective cable routing enclosure according to some example embodiments, includes (i) using a keyhole boring rig to create a keyhole in the roadway, (ii) using a keyhole boring saw of the keyhole boring rig to cut into the asphalt or concrete roadway, (iii) removing a substantially cylindrical-shaped keyhole cut-out from the road surface, (iv) preparing the keyhole to receive the protective cable routing enclosure, (v) installing the protective cable routing enclosure into the keyhole cut-out, and (vi) reinstating asphalt around the protective cable routing enclosure after installing the protective cable routing enclosure into the keyhole cut-out. Creating a keyhole cut-out and subsequently installing the protective cable routing enclosure therein reduces the time, labor, and other associated costs required to build a micro-trenched fiber optic network as compared to existing methods. The keyhole boring rig is a purpose-built piece of coring equipment that cuts or bores into the roadway to create the substantially cylindrical-shaped keyhole cut-out. The substantially cylindrical-shaped keyhole cutout is typically 12 inches in diameter to match the diameter of the enclosure (although other sizes could be used) and about 4-8 inches deep in the roadway, curb, or sidewalk. The substantially cylindrical-shaped asphalt or concrete "core" is quickly and easily removed from the road surface to create the clean and structurally sound "keyhole" cut-out that the protective cable routing enclosure is then installed into.

In some preferred embodiments, the circumference of the protective cable routing enclosure is nominally smaller than the circumference of the keyhole cut-out created by the keyhole pavement cutting machine, and thus, the cable routing enclosure fits comfortably within the keyhole, preferably with only a small gap between the cable routing enclosure and the keyhole which can be filled with traditional reinstatement material. In operation, the reinstatement material includes any one or more fill materials, such as asphalt, concrete, cement, grout, stone, gravel, and/or other fill materials. In some instances, the fill material(s) are mixed with an epoxy or other bonding material. In such embodiments, only a small amount of reinstatement material is required for the cable routing enclosure installation compared to traditional cut and chisel out methods, and as a result, the finished installation with the cable routing enclosure is more structurally sound and less prone to cracking and failing than an asphalt-reinstated portion of a cut and chiseled segment of road surface according to traditional methods.

In addition to improved structural integrity, the finished installation also substantially reduces the risk of water migration into the enclosure (and the duct(s) and cable(s) routed therein) and the road bed as compared to traditional methods. Water that migrates into the roadbed can freeze and expand, which can cause asphalt or concrete to crack and cause catastrophic failure of the road surface and underlying foundation over time, which can in turn damage or even destroy the ducting and/or fiber optic cabling installed along the roadway. But sealing and/or reinstatement of the duct and/or cable at the lateral bend and/or turn points using the disclosed protective cable enclosure seated and reinstated in a clean keyhole cut substantially mitigates the risk of water migration compared to traditional methods of reinstating cut and chiseled out portions of road material. Further, the disclosed protective cable routing enclosure lasts longer and protects ducts and fiber optic cables from damage better than the current "cut and chisel out" and reinstatement techniques described above, which improves the reliability of the installation and reduces the risk of fiber optic cable breaks and resulting communications service disruptions.

Some embodiments of the protective cable routing enclosure include a re-enterable lid that is designed and molded with concrete or plastic polymer that is sufficiently strong to withstand heavy highway traffic loads. In some embodiments, the interior walls of the protective cable routing enclosure alone and/or in combination with the re-enterable lid of the protective cable routing enclosure meets or exceeds the loading requirements defined in the H-20 (or HS-20) specification published by the American Association of State Highway Transport Officials (AASHTO). In operation, the curved interior walls and integrated base of the protective cable routing enclosure provide a support structure that can withstand roadway loading standards defined in the H-20/HS-20 specification.

In embodiments that include a re-enterable lid, the protective cable routing enclosure lid can be removed and is made of high strength plastic, cast iron, polymer concrete or other materials capable of withstanding roadway traffic loading. Having a removable lid may aid in future repairs of the duct and fiber optic cable system. Optionally, the re-enterable lid can be eliminated, and the cable routing cavity filled with a suitable load bearing reinstatement material.

The body and interior walls of the protective cable routing enclosure are designed to provide multiple duct/cable routing options and bend radius protection while providing vertical and horizontal loading support and protection to the fiber optic duct and cables routed through the ingress/egress ports of the protective cable routing enclosure.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

DETAILED DESCRIPTION OF THE DRAWINGS

Figure 1A:
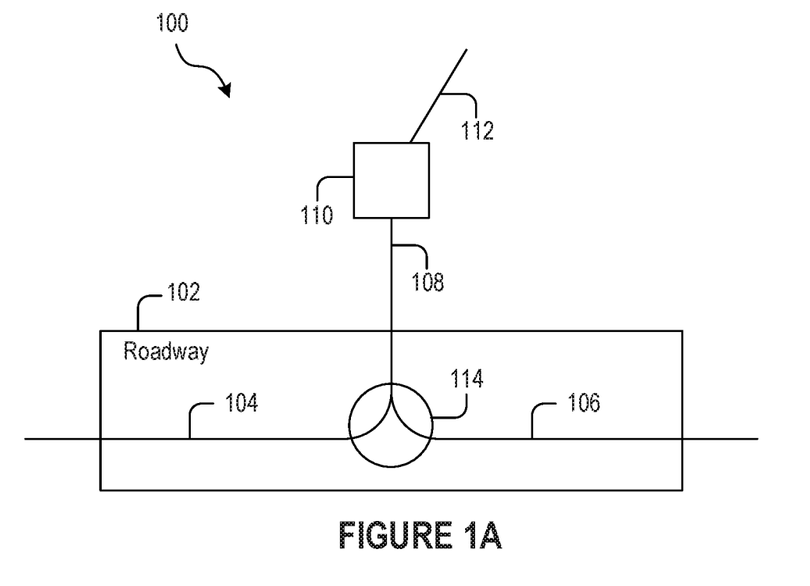
FIG. 1A shows a top view of a roadway with trenches for running fiber optic or other types of cables according to some embodiments.

FIG. 1A shows a top view 100 of a roadway 102 with trenches 104, 106, and 108 for running fiber optic or other types of cables or other utility facilities according to some embodiments.

Roadway 102 can be any road, street, highway, sidewalk, pathway, or any other type of thoroughfare paved or otherwise constructed with concrete, asphalt, or other hard material now known or later developed where it is desirable to install cables or other facilities under the existing roadway 102.

In some embodiments, trenches 104, 106, and 108 are cut into the roadway 102 to accommodate fiber optic cables and/or other types of cables and/or utilities with a sawing/boring rig as known in the art or with any other type of cutting and/or boring tool or machine now known or later developed. In the embodiment shown in FIG. 1A, trenches 104 and 106 run along the roadway 102, and trench 108 (sometimes referred to as an access trench) runs perpendicular or at least substantially perpendicular to trenches 104 and 106. Access trench 108 connects fiber optic cable deployed in trenches 104 and 106 with access pedestal 110 adjacent to the roadway 102. In operation, one or more fiber optic cables 112 (e.g., drop cables or similar cables) are deployed between the access pedestal 110 and a home or other building (not shown), and the access pedestal 110 provides access points to connect the fiber optical cable(s) 112 running from the access pedestal 110 to the home/building to fiber optic cable(s) deployed in the access trench 108 and the trenches 104 and 106 along the roadway 102, e.g., via cable splice(s) or other connection method(s) now known or later developed.

In some embodiments, one or more of trenches 104, 106, and/or 108 are formed using a micro-trenching technique, although other suitable trenching techniques now known or later developed could be used instead. Micro-trenching involves cutting a small 0.25-inch to 1.5-inch wide and 2-inch to 12-inch deep slot into and along the asphalt or concrete roadway 102. Most common installations are 0.5 to 1 inches wide and about 4 to 8 inches deep and can be located anywhere along the surface of the roadway 102.

Using a keyhole boring rig, a keyhole cut-out 114 is made in the roadway 102 at or near the intersection of trenches 104, 106, and 108. After forming the keyhole cut-out 114, a protective cable routing enclosure (such as protective enclosure 200 shown in FIGS. 2A-2B) is installed into the keyhole cut-out 114 to facilitate routing of fiber optic cables between the trenches 104 and 106 along the roadway 102 and the access trench 108 cut substantially perpendicular to the roadway 102. As described in more detail herein with reference to FIGS. 2A-2B, the structure and dimensions of the protective enclosure 200 protects the ducting and/or fiber optic cable and prevents the ducting and/or fiber optic cabling from bending beyond its minimum bend radius.

Figure 1B:
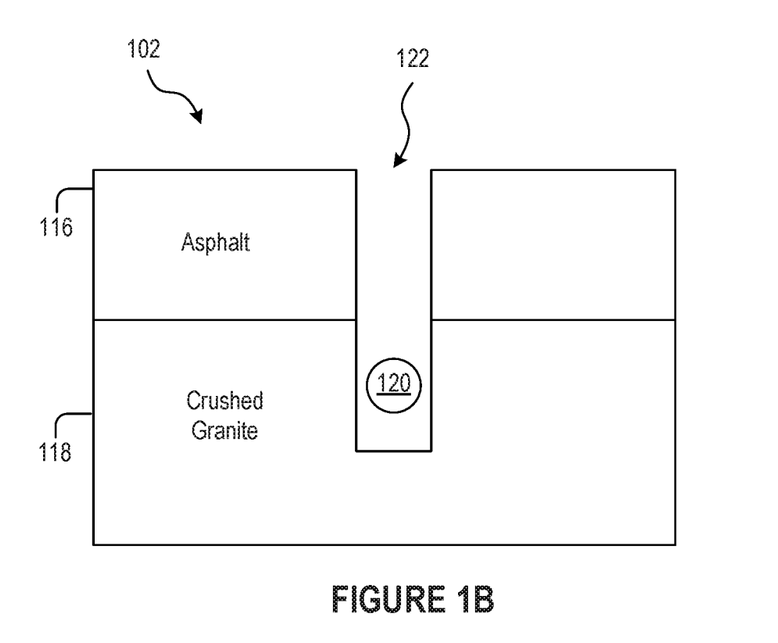
FIG. 1B shows a side view of a trench for running fiber optic or other types of cables according to some embodiments.

FIG. 1B shows a side view of a micro-trench 122, such as trenches 104, 106, and/or 108 for running fiber optic cables or other types of ducting and/or cables along the roadway 102 according to some embodiments. In the example shown in FIG. 1B, the trench 122 is cut down through the top layer 116 (typically but not necessarily asphalt) of the roadway 102 and into a sublayer 118 (typically but not necessarily crushed granite). After creating the micro-trench 122, one or more micro-ducts 120 (or other types of ducting or conduit) are deployed within the trench to accommodate one or more fiber optic cables (not shown).

In some embodiments, the fiber optic cables are deployed within (i) one or more micro-ducts 120 within a micro-trench 122 (e.g., trench 104, 106, or 108), and/or (ii) directly within the micro-trench 122 (e.g., trench 104, 106, or 108) without a micro-duct 120 or other type of protective conduit or ducting. Other types of ducting or other protective conduit could additionally or alternatively be deployed within the micro-trench or other type of trench to carry other types of cables, piping, or other utility facilities.

Example Protective Enclosure

Figure 2A:
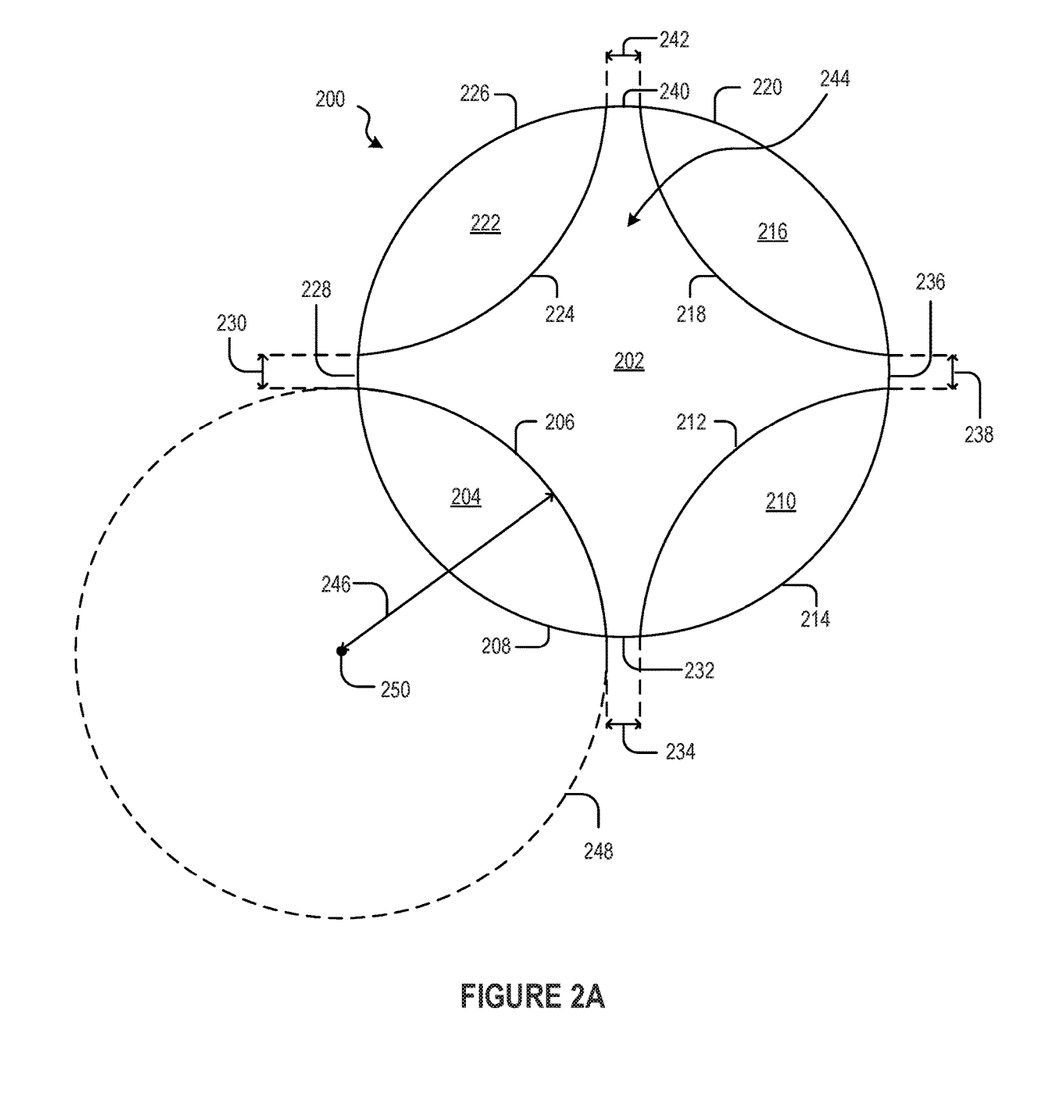
FIG. 2A shows a top view of a protective enclosure for routing fiber optic or other types of cables between trenches in a roadway according to some embodiments.
Figure 2B:
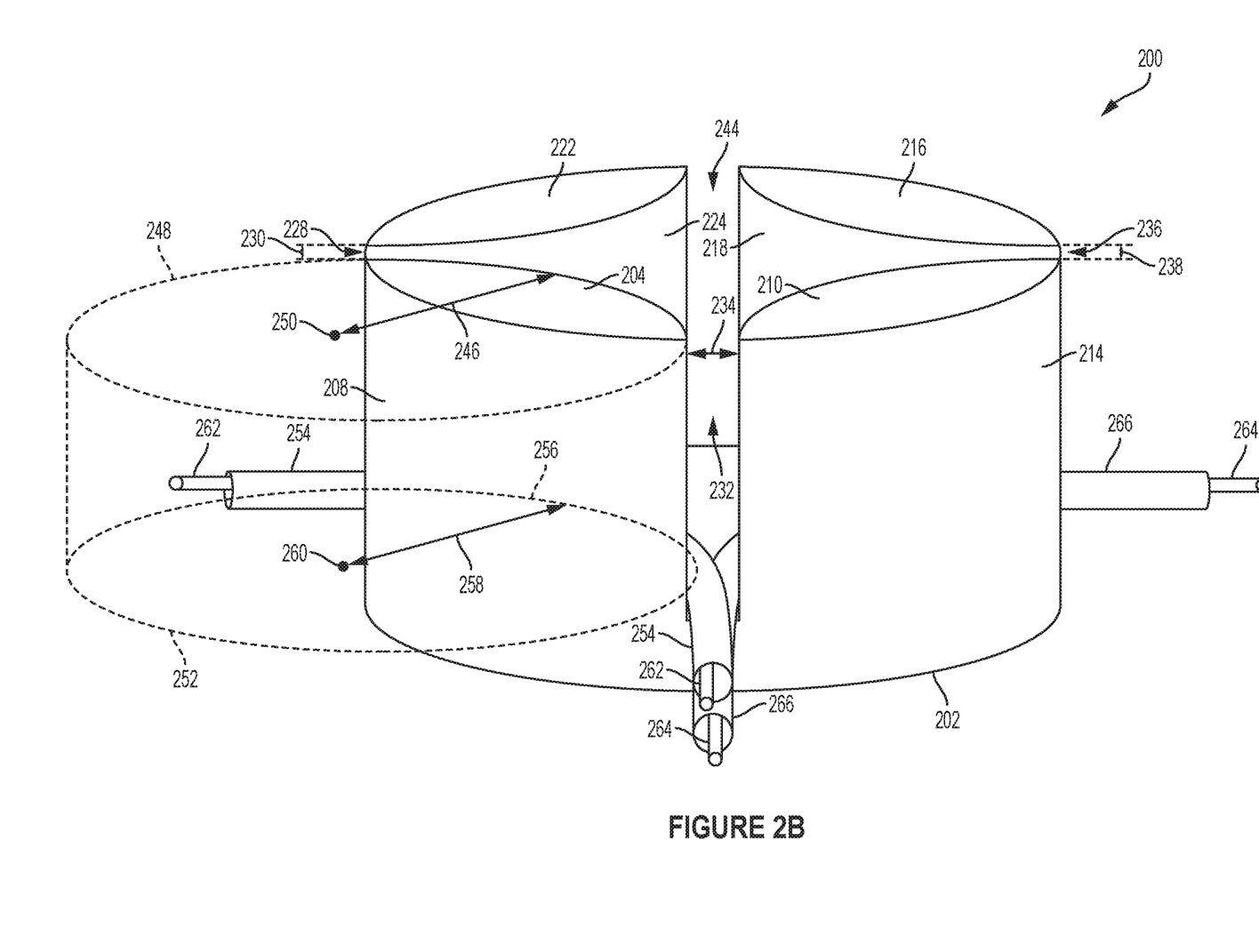
FIG. 2B shows a perspective view a protective enclosure for routing fiber optic or other types of cables between trenches in a roadway according to some embodiments.

FIG. 2A shows a top view of a protective enclosure 200 for routing fiber optic or other types of cables between trenches in a roadway according to some embodiments, and FIG. 2B shows a perspective view the protective enclosure 200.

In some embodiments, the protective enclosure 200 is configured for installation within a substantially cylindrically-shaped keyhole cut-out (such as keyhole cut-out 114 shown in FIG. 1A) in a roadway (such as roadway 102 shown in FIG. 1A) to facilitate the routing of fiber optic cables between two or more intersecting trenches (such as trenches 104, 106, and 108 shown in FIG. 1A).

The example protective enclosure 200 includes a rigid base 202 and four rigid members 204, 210, 216, and 222 that are joined to the rigid base 202 and extend upward (shown in more detail in FIG. 2B). In some embodiments, the rigid base 202 is round and substantially flat on top and bottom. In the example embodiment shown in FIGS. 2A and 2B, each rigid member of the protective enclosure 200 has a convex inner wall and a convex outer wall. In operation, the set of rigid members 204, 210, 216, and 222 form a plurality of openings 228, 232, 236, and 240 (sometimes referred herein as ports) along an outer surface of the protective enclosure 200 formed by the outer walls 208, 214, 220, and 226 of the rigid members 204, 210, 216, and 222, respectively. The set of rigid members 204, 210, 216, and 222 also form an interior space 244 bounded by the inner walls 206, 212, 218, and 224 of the four rigid members 204, 210, 216, and 222, respectively.

More specifically, the first rigid member 204 extends upward (FIG. 2B shows upward extension) from the rigid base 202 and comprises a first curved inner wall 206 and a first curved outer wall 208.

The second rigid member 210 extends upward (FIG. 2B shows upward extension) from the rigid base 202 and comprises a second curved inner wall 212 and a second curved outer wall 214. The second rigid member 210 is positioned adjacent to the first rigid member 204 and forms a first opening 232 (or port) having a first width 234 between the first rigid member 204 and the second rigid member 210.

The third rigid member 216 extends upward (FIG. 2B shows upward extension) from the rigid base 202 and comprises a third curved inner wall 218 and a third curved outer wall 220. The third rigid member 216 is positioned adjacent to the second rigid member 210 and forms a second opening 236 (or port) having a second width 238 between the second rigid member 210 and the third rigid member 216.

And the fourth rigid member 222 extends upward (FIG. 2B shows upward extension) from the rigid base 202 and comprises a fourth curved inner wall 224 and a fourth curved outer wall 226. The fourth rigid member 222 is positioned between the third rigid member 216 and the first rigid member 204 and forms (i) a third opening 240 (or port) having a third width 242 between the third rigid member 216 and the fourth rigid member 222 and (ii) a fourth opening 228 (or port) having a fourth width 230 between the fourth rigid member 222 and the first rigid member 204.

The protective enclosure 200 further comprises an interior space 244 bounded by the first curved inner wall 206, the second curved inner wall 212, the third curved inner wall 218, and the fourth curved inner wall 224.

FIG. 2B shows a first cable 262 routed within a first conduit 254 from the fourth opening 228 to the first opening 232 and a second cable 264 routed within a second conduit 266 from the first opening 232 to the second opening 236. In some embodiments, the first cable 262 may be routed from the fourth opening 228 to the first opening 232 without the first conduit 254, and/or the second cable 264 may be routed from the first opening 232 to the second opening 236 without the second conduit 266.

The example in FIG. 2B shows the first cable 262 within the first conduit 262 and the second cable 264 within the second conduit 266 where the first conduit 262 is stacked on top of the second conduit 266 within the opening 232. In other embodiments, the first conduit 254 and the second conduit 266 may be arranged side-by-side within the opening 232, depending on the width 234 of the opening 232 and the size of the first and second conduits. And in some embodiments, the first cable 262 and the second cable 264 may be routed within a single conduit having a "Y-shaped" junction component. The protective enclosure 200 can accommodate other arrangements of cables, conduits, and cables within conduits as well.

Regardless of the presence or absence of conduit(s) and/or the arrangement of the conduit(s), the protective enclosure 200 is configured to enable a fiber optic cable or cables (and perhaps other types of cables) to be routed from one opening to another opening without exceeding a minimum bend radius of the fiber optic cable or cables.

For example, the first curved inner wall 206 has a first radius of curvature 246 configured to prevent the first fiber optic cable 262 routed with conduit 254 from the fourth opening 228 to the first opening 232 through the interior space 244 along the first curved inner wall 206 from bending beyond a minimum bend radius.

The minimum bend radius for a fiber optic cable is the minimum radius that a fiber optic cable can be bent without kinking it, damaging it, or shortening its life. A fiber optic cable (or other type of cable) with a smaller minimum bend radius is more flexible and can therefore be bent more than a fiber optic cable (or other type of cable) with a larger minimum bend radius. Typically, the minimum bend radius of a fiber optic cable is about 10-15 times the diameter of the cable, so smaller diameter cables have a smaller minimum bend radius and larger diameter cables have a larger minimum bend radius. However, in some instances, factors other than cable diameter can affect the minimum bend radius, e.g., the material or mixture of materials used to manufacture the cable, the size of the fiber optic cable core or perhaps the size of the core relative to the cladding and/or outer sheath, and perhaps other cable characteristics.

FIG. 2A shows the radius of curvature 246 of the first curved inner wall 206. The radius of curvature 246 is measured from the center point 250 of a first imaginary circle 248 fitted to the curvature of the first curved inner wall 206. FIG. 2B shows the bend radius 258 of the first fiber optic cable 262 measured from the center point 260 of a second circle 256 fitted to the curvature of the first fiber optic cable 262 routed from the fourth opening 228 to the first opening 232 through the interior space 244 along the first curved inner wall 206. Because the first fiber optic cable 262 is routed along the first curved inner wall 206, the first curved inner wall 206 prevents the first fiber optic cable 262 from being bent beyond the radius of curvature 246 of the first curved inner wall 206, thereby protecting the first fiber optic cable 262 from being bent beyond its minimum bend radius.

Like the first curved inner wall 206, the second curved inner wall 212 has a second radius of curvature (not shown) configured to prevent the second fiber optic cable 264 routed from the first opening 232 to the second opening 236 through the interior space 244 along the second curved inner wall 212 from bending beyond a minimum bend radius for the second fiber optic cable 264. The third curved inner wall has a third radius of curvature (not shown) configured to prevent a third cable (not shown) routed from the second opening 236 to the third opening 244 through the interior space 244 along the third curved inner wall 218 from bending beyond a minimum bend radius for the third cable. And the fourth curved inner 224 wall has a fourth radius of curvature (not shown) configured to prevent a fourth cable (not shown) routed from the third opening 244 to the fourth opening 228 through the interior space 244 along the fourth curved inner wall 224 from bending beyond a minimum bend radius for the fourth cable.

Because the minimum bend radius for a fiber optic cable is typically based on the diameter of the fiber optic cable, in some embodiments, the radius of curvature of the curved inner walls 206, 212, 218, and 224 is based at least in part on the width of the openings 228, 232, 236, and 240. For example, in some embodiments, the radius of curvature 246 of the first curved inner wall 206 is about ten times the width 230 of the first opening 228. And in some embodiments, each of the openings 228, 232, 236, and 240 have the same or substantially the same widths 230, 234, 238, 242, respectively. In these embodiments, the protective enclosure 200 cannot accommodate a fiber optic cable with a diameter greater than the width of any individual opening 228, 232, 236, and 240. So in embodiments where the radius of curvature of each inner wall is about ten times the width of any individual opening, any fiber optic cable that can fit through the width of one of the openings can be safely routed along one of the curved inner walls to another one of the openings without bending the fiber optic cable beyond its minimum bend radius.

As described previously, and as shown in FIG. 2B, in some embodiments, fiber optic cables are routed inside of conduit, and the conduit is routed through the protective enclosure 200. In such embodiments, because the diameter of the fiber optic cable routed within a conduit is necessarily less than the diameter of the conduit, and because the diameter of the conduit must necessarily be less than the width of the opening (or else it wouldn't fit through the opening), then an enclosure with inner walls having a radius of curvature at least ten times the width of the openings would enable fiber optic cables having diameters that are less than the width of the openings to be routed safely along the curved inner walls without bending the fiber optic cable beyond its minimum bend radius. Therefore, in at least some preferred embodiments, each individual curved inner wall has a radius of curvature at least ten times greater than the width of any individual opening. However, any other ratio of inner wall radius of curvature to opening width could be used, so long as the inner wall radius of curvature is sufficiently large to ensure that a fiber optic cable routed along surface of the curved inner wall does not bend beyond its minimum bend radius.

In addition to routing the first fiber optic cable 262 in the first conduit 254 from the first opening 228 to the second opening 232 and routing the second fiber optic cable 264 from the second opening 232 to the third opening 236 in the second conduit 266, those of skill in the art would understand that protective enclosure 200 also supports routing one or more cables from any opening to any other opening. Further, those of skill in the art would understand that multiple fiber cables can be routed within a single conduit (up to the fiber capacity of the conduit) and that protective enclosure 200 can support the routing of multiple conduits carrying multiple fiber cables and/or a mixture of fiber cables and conduits from any opening to any other opening. Some embodiments may additionally include guide members extending from the surface of one or more of the curved inner walls 206, 212, 218, and 224 and/or along the rigid base 202, where the guide members facilitate the routing of multiple conduits and/or cables.

In some embodiments, the protective enclosure 200 additionally includes a lid (not shown). In some embodiments, the lid is a removable rigid lid configured to cover the interior space 244 and rest on top of at least a portion of one or more the four rigid members 204, 210, 216, and 222.

In some embodiments, one or more of the rigid base 202, the first rigid member 204, the second rigid member 210, the third rigid member 216, the fourth rigid member 222, and the removable lid comprises one or more of high strength plastic, cast iron, or polymer concrete. In some embodiments, at least one of first rigid member 204, the second rigid member 210, the third rigid member 216, the fourth rigid member 222 is solid or at least substantially solid. And in some embodiments, at least one of first rigid member 204, the second rigid member 210, the third rigid member 216, the fourth rigid member 222 is hollow. In some preferred embodiments, the protective enclosure 200 meets or exceeds H-20 roadway loading requirements published by the American Association of State Highway Transportation Officials (AASHTO).

For example, in some embodiments, the rigid member is a solid piece of plastic, cast iron, polymer concrete or other similarly rigid material. In other embodiments, the inner and outer walls of a rigid member are formed from solid plastic, cast iron, polymer concrete or other similar material, even though the interior of the rigid member bound by the inner and outer walls is otherwise hollow or substantially hollow. In some embodiments where the rigid member has solid inner and outer walls enclosing a hollow or substantially hollow interior, the hollow interior space includes structural support members that improve the overall rigidity of the rigid member (compared to a fully hollow rigid member). In some embodiments, one or more rigid members are solid and one or more other rigid members are hollow or substantially hollow (with or without structural support members). In operation, a protective enclosure that includes one or more hollow or substantially hollow rigid members is lighter weight than a protective enclosure with all solid rigid members. Preferably, in embodiments with one or more hollow or substantially hollow rigid members, the protective enclosure still meets or exceeds the H-20 roadway loading requirements mentioned above.

Also, the example embodiments shown in FIGS. 2A and 2B include four rigid members 204, 210, 216, and 222 which form a 4-port "X-shaped" protective enclosure where each port/opening is approximately 90 degrees from each adjacent port/opening. However, for other 4-port embodiments, each port/opening may be more or less than approximately 90 degrees from an adjacent port/opening.

Other example embodiments include only three rigid members, where the three rigid members are arranged to form a 3-port "T-shaped" protective enclosure. For example, with reference to FIGS. 2A and 2B, a 3-port "T-shaped" protective enclosure would include a first rigid member 204, a second rigid member 210, and a third rigid member, wherein the third rigid member has a "half-circle" shape (not shown) and is positioned substantially opposite the first rigid member 204 and second rigid member 210. Such a 3-port "T-shaped" protective enclosure would include opening 228, opening 232, and opening 238 but not include opening 240. When routing cables through such a 3-port "T-shaped" enclosure, a cable (and/or conduit) could be routed from opening 228 to opening 232 along curved inner wall 206, a cable (and/or conduit) could be routed from opening 232 to opening 236 along curved inner wall 212, and a cable (and/or conduit) could be routed from opening 228 to opening 236 along a substantially straight (or substantially non-curved) inner wall (not shown). In such an arrangement, opening 228 is approximately 90 degrees from opening 232, opening 232 is approximately 90 degrees from opening 236, and opening 236 is approximately 180 degrees from opening 228.

Example Enclosure Installation Method

Figure 3:
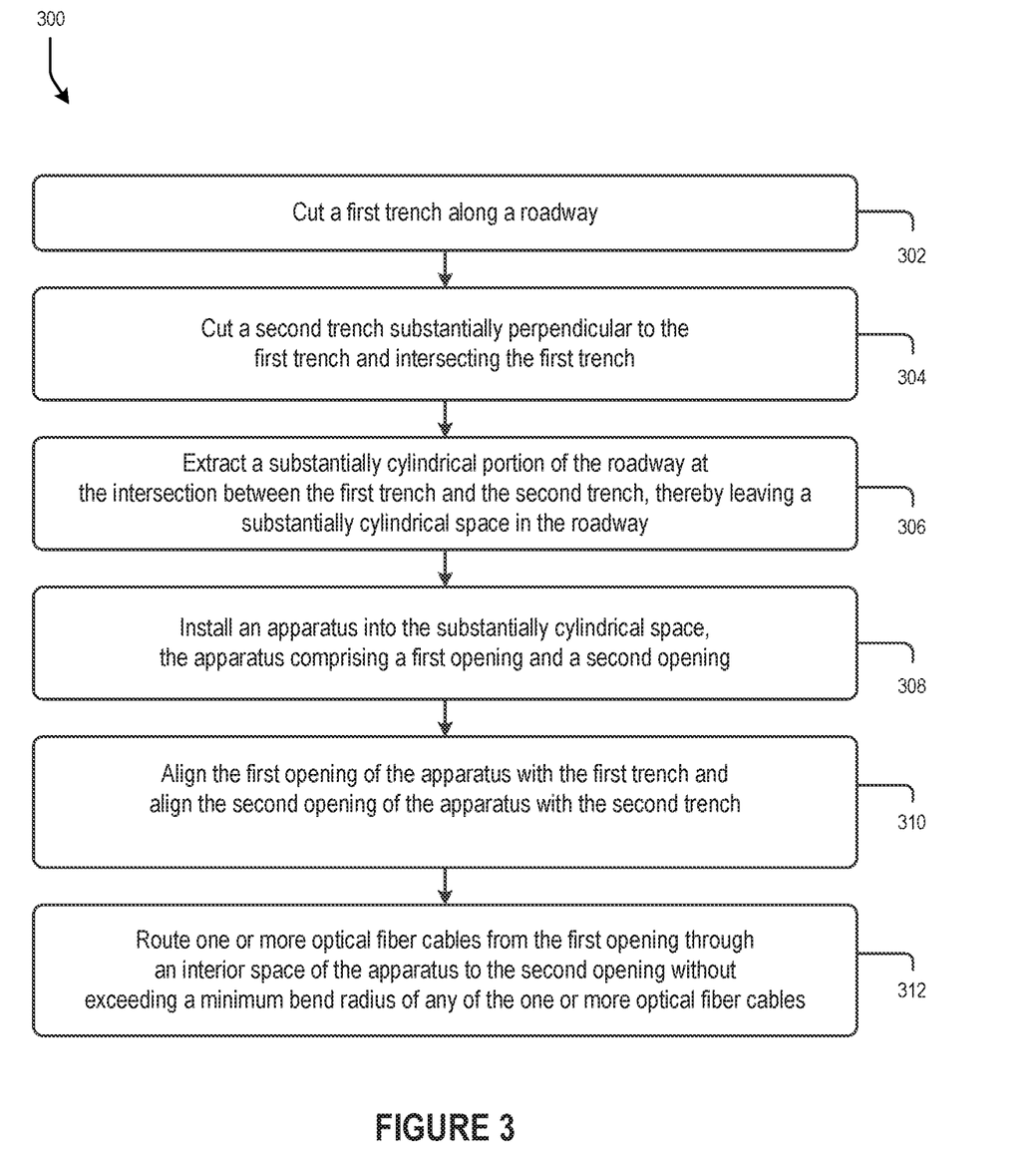
FIG. 3 shows a method of installing a protective enclosure into a roadway and routing fiber optic or other types of cables therein according to some embodiments.

FIG. 3 shows a method 300 of installing a protective enclosure into a roadway and routing fiber optic or other types of cables therein according to some embodiments. In operation, the protective enclosure can be any type of protective enclosure, including but not limited to protective enclosure 200 (FIGS. 2A and 2B), and the roadway can be any type of roadway, including but not limited to roadway 102 (FIGS. 1A and 1B).

Method 300 begins at block 302, which includes cutting a first trench along a roadway. The first trench may be similar to or the same as one or both of trenches 104 and 106 shown and described herein with reference to FIG. 1A. In operation, the first trench is sufficiently deep to accommodate at least one fiber optic cable individually or deployed within a protective conduit. In some embodiments, the first trench is formed via a trenching tool according the trenching methods disclosed herein or any other trenching method now known or later developed.

Next, method 300 advances to block 304, which includes cutting a second trench substantially perpendicular to the first trench and intersecting the first trench. The second trench may be similar to or the same as access trench 108 shown and described herein with reference to FIG. 1A. In operation, the first trench is sufficiently deep to accommodate at least one fiber optic cable individually or deployed within a protective conduit. In some embodiments, the second trench is formed via a trenching tool according the trenching methods disclosed herein or any other trenching method now known or later developed.

Next, method 300 advances to block 306, which includes extracting a substantially cylindrical portion of the roadway at the intersection between the first trench and the second trench, thereby leaving a substantially cylindrical space in the passageway. The substantially cylindrical portion of the roadway may be similar to or the same as the keyhole cut-out 114 shown and described herein with reference to FIG. 1A. In operation, the substantially cylindrical portion of the roadway is sufficiently deep to accommodate installation of a protective enclosure, such as protective enclosure 200 shown and described herein with reference to FIGS. 2A and 2B. In some embodiments, the substantially cylindrical portion of the roadway is formed via a keyhole boring machine according the boring methods disclosed herein or any other boring method now known or later developed.

Next, method 300 advances to block 308, which includes installing a protective enclosure into the substantially cylindrical space. In some embodiments, the protective enclosure comprises (i) a round base, and (iii) four rigid members joined to the round base. In some embodiments, each rigid member has an inner wall and an outer wall, where the four rigid members extend upward from the round base and form at least a first opening and a second opening along an outer surface of the protective enclosure formed by the outer walls of the rigid members of the protective enclosure and an interior space bounded by the inner walls of the four rigid members. In some embodiments, the first opening and the second opening each have a width sufficient to accommodate at least one optical fiber cable routed from the first opening through the interior space to the second opening along the inner wall of the rigid member positioned between the first opening and the second opening. In some embodiments, the inner wall of the rigid member positioned between the first opening and the second opening has a radius of curvature at least ten times greater than the width of the first opening or the width of the second opening. In some embodiments, the protective enclosure is the same as or similar to protective enclosure 200 shown and described with reference to FIGS. 2A and 2B.

Next, method 300 advances to block 310, which includes aligning the first opening of the protective enclosure with the first trench and aligning the second opening of the protective enclosure with the second trench.

Next, method 300 advances to block 312, which includes routing one or more optical fiber cables from the first opening of the protective enclosure through the interior space of the protective enclosure to the second opening of the protective enclosure along the inner wall of the rigid member positioned between the first opening and the second opening without exceeding a minimum bend radius of any of the one or more optical fiber cables.

Some embodiments additionally include, after routing one or more optical fiber cables from the first opening through the interior space to the second opening along the inner wall of the rigid member positioned between the first opening and the second opening, attaching a rigid lid on top of the apparatus, thereby covering the interior space of the apparatus. Some embodiments additionally or alternatively include, after routing one or more optical fiber cables from the first opening through the interior space to the second opening along the inner wall of the rigid member positioned between the first opening and the second opening, filling the interior space bounded by the inner walls of the four rigid members with reinstatement material.

Finally, in some embodiments, the substantially cylindrical space comprises an interior wall, and method 300 additionally includes filling a gap between the outer surface of the protective enclosure and the interior wall of the cylindrical space with reinstatement material.

Some embodiments have been described with reference to particular features and functions. In view of the disclosure herein, it will be apparent to those skilled in the art that various modifications and variations can be made to the embodiments disclosed and described herein without departing from the scope or spirit of the invention(s). One skilled in the art will recognize that the disclosed features and functions may be used singularly, in any combination, or omitted based on the requirements and specifications of a given application or design.

What is claimed is:

1. An apparatus comprising:
    a rigid base;
    at least three rigid members joined to the rigid base, wherein each rigid member has an inner wall and an outer wall, wherein the at least three rigid members extend upward from the rigid base to form at least a first opening and a second opening along an outer surface formed by the outer walls of the rigid members of the apparatus and an interior space bounded by the inner walls of the at least three rigid members, wherein the first opening and the second opening each have a width sufficient to accommodate an underground conduit enclosing at least a portion of at least one cable routed from the first opening through the interior space to the second opening along the inner wall of the rigid member positioned between the first opening and the second opening, and wherein the inner wall of the rigid member positioned between the first opening and the second opening has a radius of curvature at least ten times greater than the width of the first opening or the width of the second opening; and
    a rigid lid affixable to a top of the apparatus after the apparatus has been installed underground and at least one cable has been routed between the first opening and the second opening, wherein the rigid lid is configured to rest on top of at least a portion of the at least three rigid members and cover the interior space.

2. The apparatus of claim 1, wherein one or more of (i) the rigid base, (ii) the at least three rigid members, or (iii) the rigid lid comprises:
    one or more of (a) high strength plastic, (b) cast iron, or (c) polymer concrete.

3. The apparatus of claim 1, wherein the inner wall of at least one of the rigid members is solid.

4. The apparatus of claim 1, wherein at least one of the rigid members is at least partially hollow.

5. The apparatus of claim 1, wherein the radius of curvature is configured to prevent a cable routed along the inner wall from bending beyond a minimum bend radius for the cable.

6. The apparatus of claim 1, wherein the rigid members, rigid base, and rigid lid of the apparatus form a support structure that meets or exceeds H-20 roadway loading requirements.

7. The apparatus of claim 1, wherein individual interior walls comprise cable routing guide members.

8. An apparatus comprising:
    a round base;
    a first member extending upward from the round base, wherein the first member comprises a first curved inner wall and a first curved outer wall;
    a second member extending upward from the round base, wherein the second member comprises a second curved inner wall and a second curved outer wall, and wherein the second member is positioned adjacent to the first member and forms a first opening between the first member and the second member, wherein the first opening has a width configured to receive an underground conduit enclosing at least a portion of a cable;

a third member extending upward from the round base, wherein the third member comprises a third curved inner wall and a third curved outer wall, and wherein the third member is positioned adjacent to the second member and forms a second opening between the second member and the third member, wherein the second opening has a width configured to receive an underground conduit enclosing at least a portion of a cable;

a fourth member extending upward from the round base, wherein the fourth member comprises a fourth curved inner wall and a fourth curved outer wall, wherein the fourth member is positioned between the third member and the first member and forms (i) a third opening between the third member and the fourth member, wherein the third opening has a width configured to receive an underground conduit enclosing at least a portion of a cable and (ii) a fourth opening between the fourth member and the first member, wherein the fourth opening has a width configured to receive an underground conduit enclosing at least a portion of a cable;

an interior space bounded by the first curved inner wall, the second curved inner wall, the third curved inner wall, and the fourth curved inner wall, wherein the first curved inner wall has a first radius of curvature configured to prevent a first cable routed from the first opening to the fourth opening through the interior space along the first curved inner wall from bending beyond a minimum bend radius for the first cable, wherein the second curved inner wall has a second radius of curvature configured to prevent a second cable routed from the first opening to the second opening through the interior space along the second curved inner wall from bending beyond a minimum bend radius for the second cable, wherein the third curved inner wall has a third radius of curvature configured to prevent a third cable routed from the second opening to the third opening through the interior space along the third curved inner wall from bending beyond a minimum bend radius for the third cable, and wherein the fourth curved inner wall has a fourth radius of curvature configured to prevent a fourth cable routed from the third opening to the fourth opening through the interior space along the fourth curved inner wall from bending beyond a minimum bend radius for the fourth cable, and wherein each of first radius of curvature, second radius of curvature, third radius of curvature, and fourth radius of curvature is at least ten times greater than any of the width of the first opening, the width of the second opening, the width of the third opening, or the width of the fourth opening; and a rigid lid affixable to a top of the apparatus after the apparatus has been installed underground and at least one cable has been routed between at least two of the first, second, third, or fourth openings, wherein the rigid lid is configured to rest on top of at least a portion of the first, second, third, and fourth members and cover the interior space.

9. The apparatus of claim 8, wherein one or more of the round base, the first member, the second member, the third member, the fourth member, and the rigid lid comprises one or more of high strength plastic, cast iron, or polymer concrete.

10. The apparatus of claim 8, wherein at least one of the first member, the second member, the third member, and the fourth member is solid.

11. The apparatus of claim 8, wherein at least one of the first member, the second member, the third member, and the fourth member is hollow.

12. The apparatus of claim 8, wherein the first radius of curvature, the second radius of curvature, the third radius of curvature, and the fourth radius of curvature are substantially equal to each other.

13. The apparatus of claim 8, wherein the apparatus meets or exceeds H-20 roadway loading requirements.

* * * * *